United States Patent

Casella et al.

[15] 3,673,340

[45] June 27, 1972

[54] DATA-EVALUATION SYSTEM FOR TELEPHONE EXCHANGE

[72] Inventors: Luigi Casella; Aldo Perna; Giuseppe Valbonesi, all of Milan, Italy

[73] Assignee: Societa Italiana Telecommunicazioni Siemens SpA, Milan, Italy

[22] Filed: April 20, 1970

[21] Appl. No.: 30,132

[30] Foreign Application Priority Data

April 18, 1969 Italy ..........15735 A/69

[52] U.S. Cl. ..........179/18 J, 179/7.1 TP, 179/18 ES

[51] Int. Cl. ..........H04q 11/00, H04m 15/18

[58] Field of Search ..........179/18 J, 18 FG, 18 FF, 18 EB, 179/7 R, 7.1 R, 15 AT

[56] References Cited

UNITED STATES PATENTS

| | | | |
|---|---|---|---|
| 3,524,946 | 8/1970 | Pinet et al. | 179/18 J |
| 3,366,743 | 1/1968 | Darre et al. | 179/18 J |
| 3,244,811 | 4/1966 | Vogel | 179/18 J X |

*Primary Examiner*—Kathleen H. Claffy
*Assistant Examiner*—Thomas W. Brown
*Attorney*—Karl F. Ross

[57] ABSTRACT

A monitoring memory (300) of the circulating type has a first section ($M_C$) with 100 phases for the activities of as many local lines identified by two-digit decimal numbers, a second section ($M_R$) subdivided into several multiphase storage units (RET) for receiving, evaluating and transmitting information relating to a call involving an associated local line, and a third section ($M_S$) carrying supplemental information such as the time of day. With 800 phases circulating at a rate of one memory cycle per 800 $\mu$s, two consecutive counting phases in the third memory section are stepped once per cycle to produce, consecutively, the 100 line-identification numbers or addresses 00–99. A digital counter (100), operating in synchronism with the first section of the monitoring memory, periodically delivers the addresses of the 100 local lines to a comparator (820) matching them with the progressively changing address information stored in the third memory section for a successive sampling of all the lines at intervals of 100 cycles, or 80 ms; this comparison is facilitated by the concurrent tapping of the two consecutive counting phases of the third memory section ($M_S$) whereby the two address digits are simultaneously made available. If a line is found engaged, this information is fed to a logic network ($E_C$) which thereupon seizes an available storage unit (RET) to register the pertinent data in the phases thereof and to feed them to a tape perforator (PF). Upon the response of the called station, or upon premature termination by the calling party, the storage unit (RET) is released; when the call is completed, the same or another such unit and perforator are seized to record the length of the conversation.

11 Claims, 10 Drawing Figures

FIG. 1

INVENTORS:
Luigi Casella
Aldo Perna
Giuseppe Valbonesi

BY Karl F. Ross
ATTORNEY

INVENTORS:
Luigi Casella
Aldo Perna
Giuseppe Valbonesi

BY Karl F. Ross
Attorney

INVENTORS:
Luigi Casella
Aldo Perna
Giuseppe Valbonesi
BY Karl G. Ross
Attorney

Luigi Casella
Aldo Perna
Giuseppe Valbonesi
INVENTORS.

BY

Karl F. Ross
Attorney

INVENTORS:
Luigi Casella
Aldo Perna
BY Giuseppe Valbonesi
Attorney
ATTORNEY

INVENTORS:
Luigi Casella
Aldo Perna
Giuseppe Valbonesi
BY
Karl F. Ross
ATTORNEY

Luigi Casella
Aldo Perna
Giuseppe Valbonesi
INVENTORS

BY Karl F. Ross
Attorney

DATA-EVALUATION SYSTEM FOR TELEPHONE EXCHANGE

Our present invention relates to a telecommunication system, such as a telephone exchange, wherein a multiplicity of local lines are cyclically scanned to determine their state of energization, i.e. to find out whether a party has taken command of any such line for the purpose of initiating a call to another party to be reached through that system. As a call proceeds, with the usual sequence of selection (as by the emission of dialing pulses), ringing of the called party, response (if any) by that party and, eventually, termination of the call, its progress can be monitored by the recurrent ascertainment of the voltage level on one or more wires forming part of the line under surveillance.

In commonly owned application, Ser. No. 802,486, filed 26 Feb. 1969 by Saverio Martinelli and Giorgio De Varda, now U.S. Pat. No. 3,581,016, there has been disclosed a telecommunication system of the time-sharing or time-division-multiplex (TDM) type wherein a circulating memory is used to monitor the progress of such a call and to register, in a time slot or phase allocated to that particular conversation, a succession of different code words identifying the various stages of the call. The monitoring memory is synchronized with two similar circulating memories, respectively termed the caller memory and the responder memory, which carry the addresses (i.e. line-identifying digits) of the calling station and the called station in corresponding time slots. Thus, upon the recurrence of this particular phase during any scanning cycle, the two addresses and the information relating to the state of their communication are concurrently reproduced for re-evaluation, i.e. updating in terms of current line-voltage level, and recording in a permanent storage medium for billing and other purposes.

In the system described in that earlier application, the two address memories are each divided into three parallel sections for the inscription, in binary form, of respective digits of a three-digit line number. With a scanning cycle of 100 $\mu s$ subdivided into 100 phases of 1 $\mu s$ each, and with a few of these phases reserved for special service codes, the system described in that prior application is designed to survey nearly 100 actual or potential connections simultaneously.

Since the generation of a dialing pulse, the response of a called party and the breaking of a connection are events recurring at considerably longer intervals, a group of subscriber lines terminating at a given exchange may be consecutively sampled during successive scanning cycles. In the above-described system, the sampling of 1,000 associated subscribers can be accomplished during a test cycle of 100 ms whereby each line is tested at a rate of ten times per second. For this purpose, that system allocates a service phase in its responder memory to the call number of the line to be sampled, this call number being progressively increased (or decreased) by the numerical value "1" after each scanning cycle so as to remain unchanged within that memory for the duration of such a cycle. A comparator matches this registered call number, as temporarily stored in a buffer register, with the 1,000 subscribed addresses successively issuing from the caller memory in the course of one scanning cycle and, upon determining an identity, commands the sampling of the voltage of that line to determine whether its user is about to initiate a call. If this is the case, a call-initiating signal is sent to the monitoring memory for inscription of an appropriate code word in the phase of that memory corresponding to the phase of the caller memory assigned to that line. Upon the periodic retesting of the same line, dial pulses are detected which identify a called party whose number is thereupon inscribed in the corresponding phase of the responder memory. In the event of noncompletion or termination of the connection, these memory phases or time slots are vacated so as to become available for another call.

During the actual conversation between the two parties, which usually lasts much longer than the establishment of the connection, the phase assigned to this call in the monitoring memory remains continuously occupied even though no recordable events take place during that period. Thus, an object of our present invention is to provide an improved system of this general type enabling the release of the monitoring memory during actual interparty communication whereby the same memory section can intervene in the initiation and in the termination of any number of overlapping calls.

Another object of our invention is to provide means in such a system for simultaneously reading out the contents of a plurality of consecutive memory time slots or phases (the latter term, though perhaps less accurate, will be exclusively used hereinafter for the sake of convenience) whereby several phases of a circulating memory can be used to register a multi-digit line number, thus eliminating the need for a memory subdivided into several parallel sections.

A further object of this invention is to provide means in such a system for enabling a more frequent sampling of a line found to be engaged in the establishment of a connection, in order to afford a more positive verification of the current state of energization of a line with elimination of false information due to spurious transients.

These objects are realized, in accordance with our present invention, by serially dividing the above-described monitoring memory into several sections, i.e. a first section following the progress of the call on any local line, a second section serving as an intermediate evaluator, and advantageously a third section for the performance of ancillary and service functions. The second section, in its turn, is subdivided into several multiphase storage units for receiving, evaluating and transmitting instantaneous information relating to a call in progress. These storage units, all identically organized, are individually engageable by an associated logic network which includes a data processor discriminating between several events, in particular (a) the discontinuance of an uncompleted call by the initiating party, (b) the response of the called party, and (c) the completion of the call after the establishment of inter-party communication. If the call is prematurely terminated by the initiating party, or when the called party answers, the seized storage unit is promptly released, together with a previously engaged tape recorder of, for example, the tape-perforating or the magnetic-tape type. When the connection is finally broken by either party, the data processor re-engages the same storage unit, or some other such unit then available, to make a final entry in the recording medium of the same or another perforator or the like.

In the course of a complete conversation, these entries generally include an identification of the local line, a similar identification of the called party (derived from the dialing pulses or other selection signals), the time of establishment of the connection and the time of its termination; the difference between these two times represents, of course, the duration of the actual call as required for computation of the charge.

With a circulating memory of the type using four parallel magnetostrictive delay lines, as described in the aforementioned application, Ser. No. 802,486 and in several other commonly owned copending applications (Ser. No. 676,135 filed 18 Oct. 1967 by Giorgio De Varda and Saverio Martinelli, now U.S. Pat. No. 3,551,598; Ser. No. 735,606 filed 10 June 1968 by Georgio De Varda, Saverio Martinelli and Aldo Perna, now U.S. Pat. No. 3,603,774; Ser. No. 771,770 filed 30 Oct. 1968 by Luigi Casella and Giorgio De Varda, now U.S. Pat. No. 3,560,662), each memory phase can accommodate any of 16 different code words. In a decimal/binary system, this requires a separate phase for each decade. In accordance with another feature of our present invention, we provide such a memory with a plurality of staggered outputs, one phase apart, whereby the words stored in consecutive phases can be read out concurrently for comparison with the instantaneous output of a digital counter operating in step with the monitoring memory, e.g. another circulating memory with 100 addresses inscribed in 200 phases. In an exchange equipped with conventional circuitry for identifying a subscriber line connected through a line finder to one of the available line links of the exchange, registration of the identity of the line link together with the time of seizure will provide identification of the caller; thus, such a 100-step counter will be sufficient for an exchange with 100 line links serving a substantially larger number of local subscribers. The term "local line," as used in this description and in the appended claims, is therefore intended to encompass such internal line links as well as incoming subscriber lines.

The third memory section may be used for the temporary registration of chronometric data from an associated clock circuit and may also include a plurality of consecutive counting phases which are periodically stepped, between successive memory cycles, in an ascending or descending sense so as to reproduce, via the aforementioned staggered outputs, the address of a different line in each memory cycle. If the expanded monitoring memory (as compared with the corresponding memory of application Ser. No. 802,486) has a repetition period or cycle of 800 μs, 100 such lines will be sampled in 80 μs.

The above and other features of our invention will be described in greater detail hereinafter with reference to the accompanying drawing in which.

Figure 1:
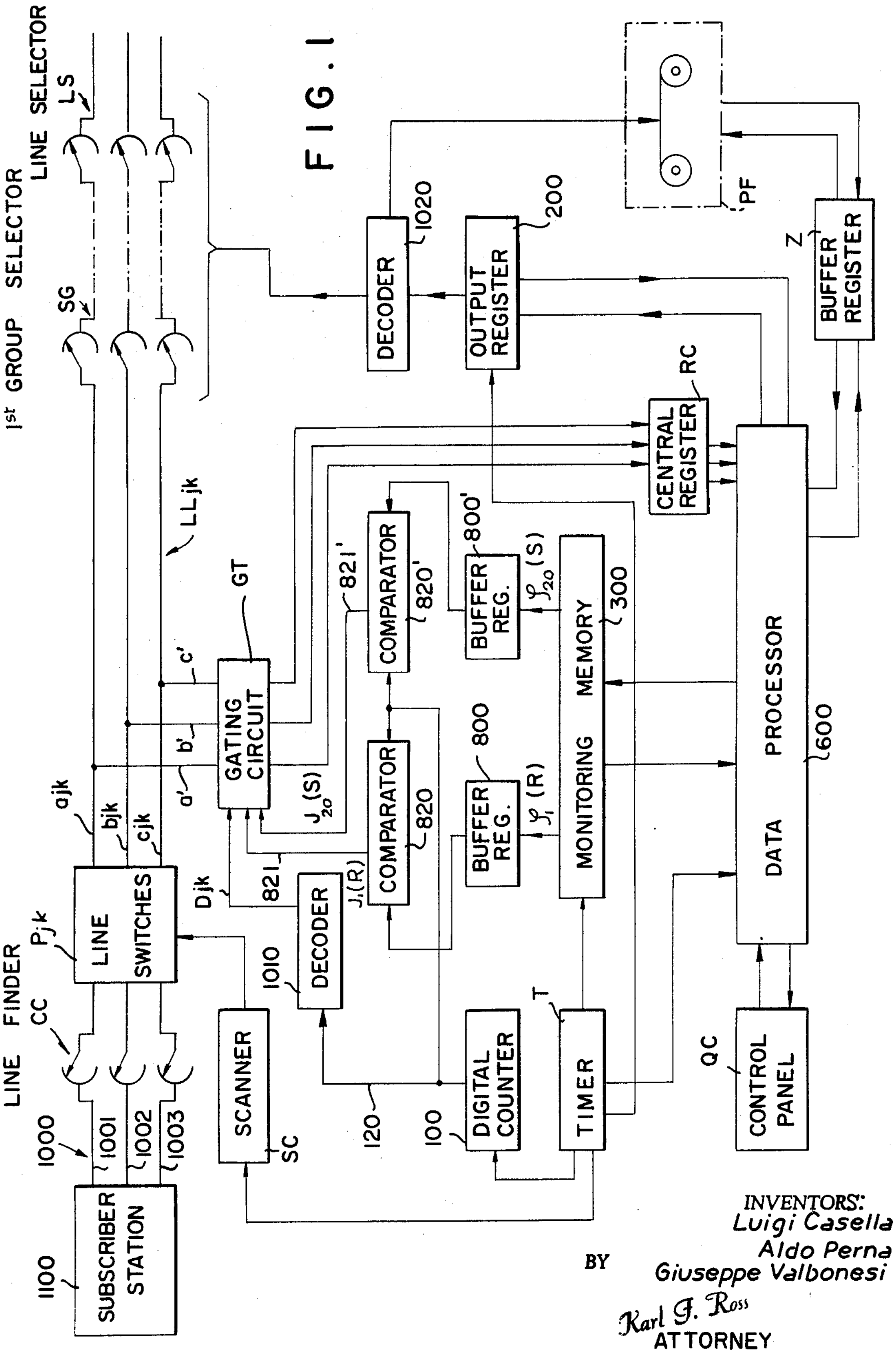
FIG. 1 is a block diagram illustrating the layout of various components of a telephone exchange forming part of a system according to our invention.

Where applicable, reference characters used in the ensuing description correspond to those designating analogous components in the above-identified application, Ser. No. 802,486.

In FIG. 1 we have shown part of a telephone exchange representing the terminus of a multiplicity of incoming lines 1000 (only one shown) originating at as many subscriber stations 1100. Each of these lines has three wires 1001, 1002, 1003, conventionally referred to as "*a*," "*b*," "*c*" wires, connectable via respective switch levels of a line finder CC to corresponding wires of a local line at the exchange, one such local line being illustrated as a link $LL_{jk}$ with wires $a_{jk}$, $b_{jk}$ and $c_{jk}$. The subscripts *j* and *k* designate the tens and units digits of any line-identification number ranging from 00 through 99, there being assumedly 100 such local lines available for interchangeable seizure by a calling subscriber. Also shown are a first group selector SG and a final or line selector LS by which the call may be extended to another party, in a manner well known *per se*, either directly (if the called party is a local subscriber) or by way of a trunk line.

It will further be assumed, for purposes of this description, that seizure of a line link by a calling subscriber grounds the "*c*" wire, that the response of a local subscriber grounds the "*a*" wire and that the "*b*" wire is energized if a trunk answers. Thus, affirmative signals designed to advance a call are designated hereinafter by A (grounding of wire "*a*"), B (energization of wire "*b*") and C (grounding of wire "*c*"), their inversions $\overline{A}$, $\overline{B}$ and $\overline{C}$ having the opposite significance.

A set of electronic line switches $P_{jk}$, controlled by a scanner SC, are inserted in wires $a_{jk}$, $b_{jk}$, $c_{jk}$ and are closed once per scanning cycle in response to a clock pulse of 1 μs cadence emitted by a timer T; it will be understood that the corresponding gate switches of the other line links are closed at different times within the same scanning cycle. This repetitive closure, at a frequency of 10.000 c.p.s., serves during interparty conversation for the sampling of voice amplitudes in a manner well known *per se* and not relevant to the present disclosure.

Leads *a'*, *b'* and *c'* branched off the wires $a_{jk}$, $b_{jk}$, $c_{jk}$ and transverse a gating circuit GT more fully described hereinafter with reference to FIG. 3. This gating circuit is under the control of a decoder 1010, with a set of output leads collectively designated $D_{jk}$, and also responds to signals $J_1(R)$ and $J_{20}(S)$ developed on output leads 821, 821' of a pair of comparators 820, 820', respectively.

A monitoring memory 300 of the circulating type, more fully described hereinafter, is synchronized via timer T with a digital counter 100 working, through an output circuit 120, into the decoder 1010 as well as into the two comparators 820, 820'. Certain output leads of memory 300, designated $\phi_1(R)$ and $\phi_{20}(S)$ in conformity with the respective phases of that memory whose signals they are designed to carry under the control of timer T, extend to respective buffer registers 800, 800' which preserve their signals over a full memory cycle and make them available to the other inputs of the comparators 820 and 820', respectively.

Beyond gating circuit GT, the leads a', b', c' extend to a central register RC working into a logic network 600 having input and output connections from and to the memory 300. This logic network, operating as a data processor, also communicates with a control panel QC from which it may manually receive information not available from within the exchange itself, such as the day, month and year and certain system parameters (e.g. the time base of the dialing pulses or other selection signals).

An output register 200 co-operates with logic network 600 and, like the latter, receives the clock pulses from timer T for proper synchronization with memory 300. Output register 200, through a decoder 1020, controls the selector switches SG, LS, in a manner not relevant to the present invention, on the basis of dialing information obtained from memory 300 via data processor 600. Decoder 1020 also controls a tape puncher or perforator PF which is seized by the network 600, through the intermediary of a buffer register Z, when a call is in progress. Perforator PF serves to record the data relevant to such call, originally stored in memory 300, at the beginning and upon completion of the call.

Figure 2A:
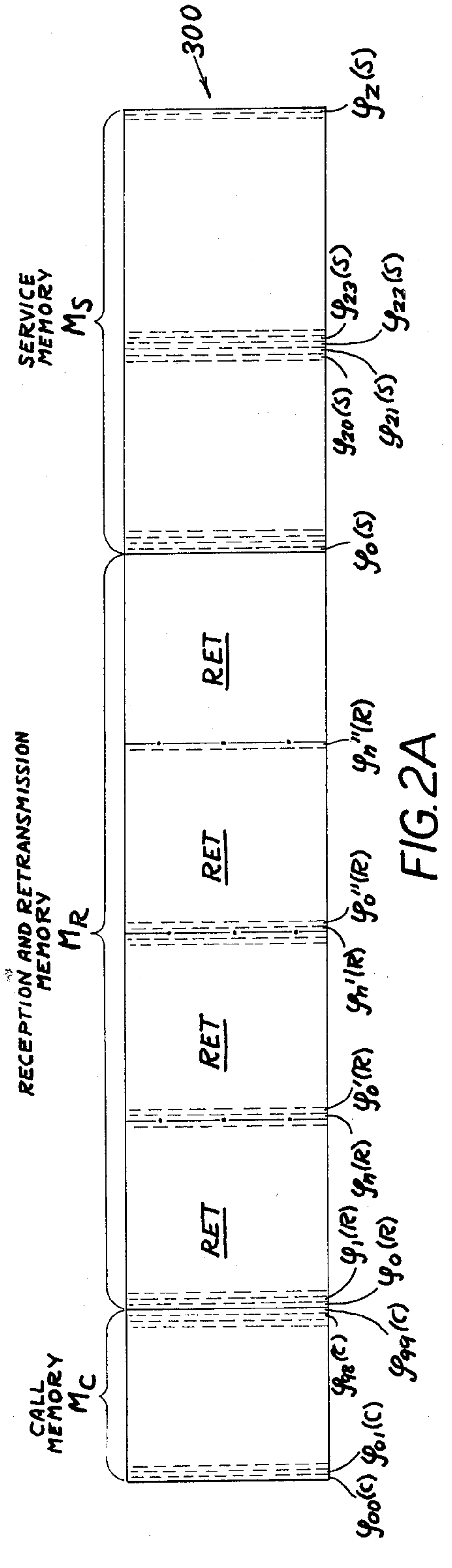
FIG. 2A is a schematic representation of a circulating memory included in the system of FIG. 1.

FIG. 2A shows the serial division of memory 300 into three main sections $M_C$, $M_R$ and $M_S$.

Section $M_C$, which may be designated a call memory, performs the task of continuously supervising the progress of a call from its inception to its termination, being provided for this purpose with 100 phases $\phi_{00}(C)$, $\phi_{01}(C)$, . . . . . $\phi_{98}(C)$, $\phi_{99}(C)$. Each of these phases is permanently assigned to a respective line link $LL_{00}$ – $LL_{99}$(FIG. 3) and, when that line link is in use, receives a succession of code words identifying a sequence of states (No. 1 to No. 10) as more fully described in U.S. Pat. No. 3,581,016, i.e. from network 600; These states are brought about not only by events which are significant for record-keeping purposes, such as the start and the end of a conversation or the response of the called party, but also by such incidental occurrences as the presence of dial tone, the reception of a busy signal or the generation of ringing current whose inscription in the memory is only temporarily required for the sake of continuity and the orderly advance from one calling stage to the next.

Section $M_R$ comprises a plurality of identical multi-phase storage units RET (Reception, Evaluation and Transmission). Each unit RET consists of a number of phases $\phi_0(R)$, $\phi_1(R)$, . . . . . $\phi_n(R)$ in the case of the first unit, $\phi_0'(R)$ . . . . . $\phi_n'(R)$ in the case of the second unit, $\phi_0''(R)$ . . . . . $\phi_n''(R)$ in the case of the third unit, and so forth. The number *n* of the phases of any unit RET may very, in practice, between about 15 and 60, depending on the number of data to be stored.

Section $M_S$ constitutes a service memory with a multiplicity of phases $\phi_0(S)$ . . . . . $\phi_z(S)$; some of these phases, designated $\phi_{20}(S)$ – $\phi_{23}(S)$, have been separately indicated since they will be referred to later on.

The total number of phases in memory 300 is assumed to be 800 which allows for a larger or smaller number of units RET depending on the selected values of *n* and *z*.

Figure 2B:
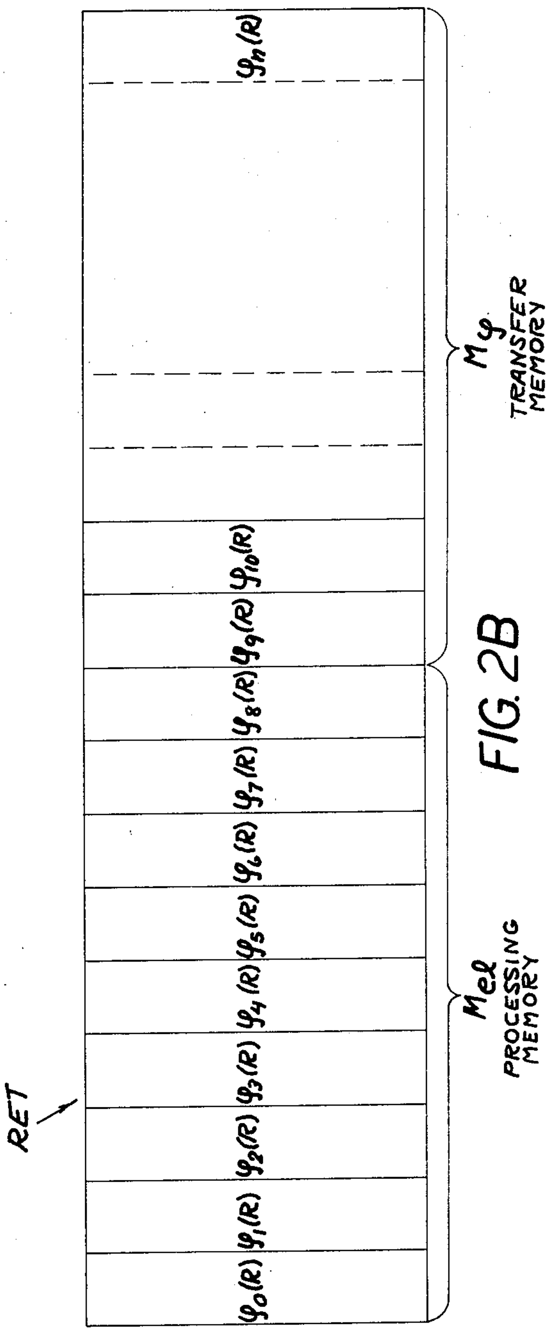
FIG. 2B is a schematic representation, similar to FIG. 2A but spread out over a larger time base, of a portion of the memory shown in FIG. 2A.

As illustrated in FIG. 2B, each storage unit RET consists of two subunits $M_{el}$, serving as a processing memory, and $M\phi$, serving as a transfer memory, Subunit $M_{el}$ encompasses the first nine phases $\phi_0(R) - \phi_8(R)$ of the unit RET, the remaining phases $\phi_9(R), \phi_{10}(R), \ldots . . \phi_n(R)$ being part of subunit $M\phi$.

Figure 7:
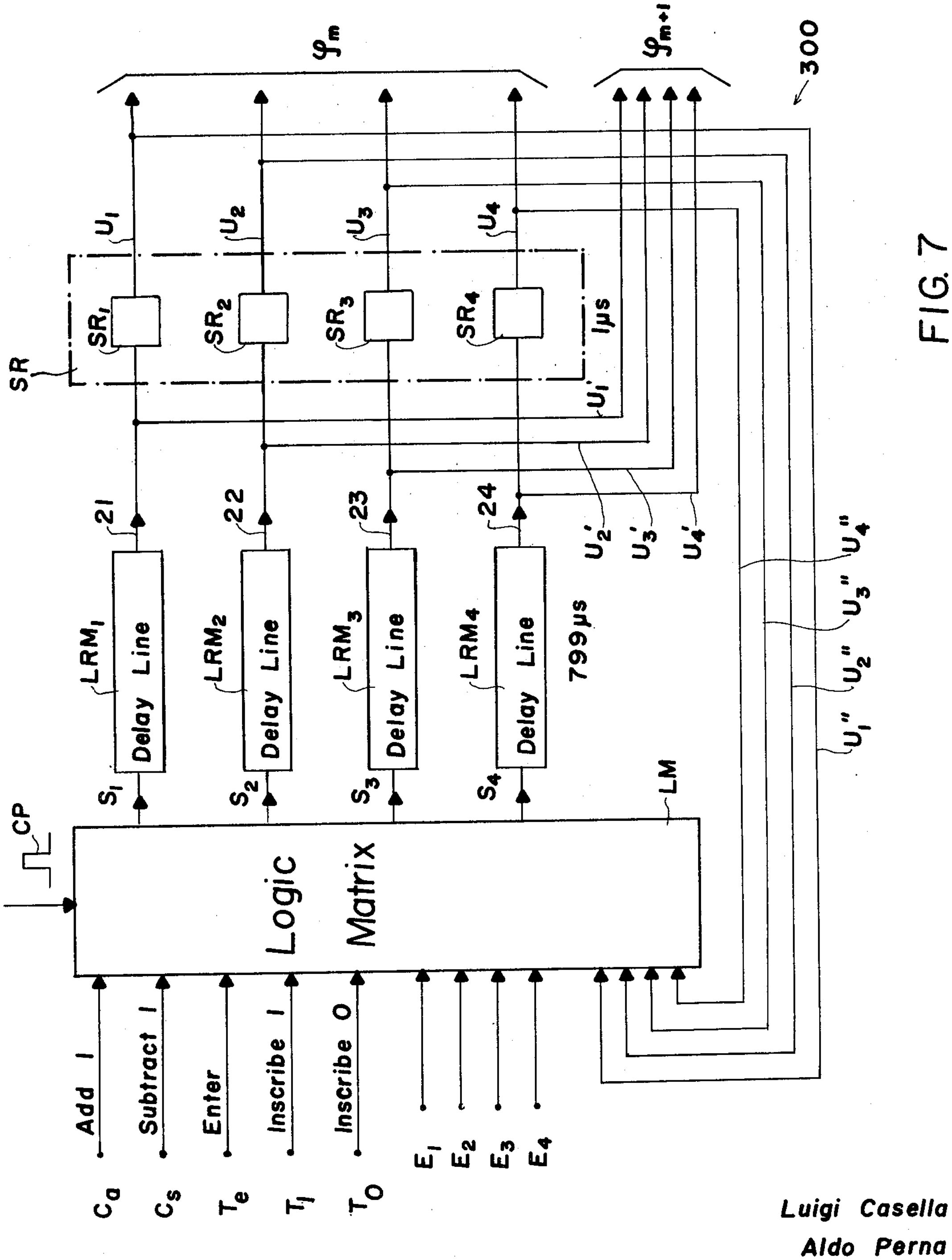
FIG. 7 is a more detailed diagram of the circulating memory of FIGS. 2A and 2B.

FIG. 7 shows the overall organization of memory 300 which comprises a logical matrix LM with nine inputs and four outputs, these outputs leading to four parallel delay lines $LRM_1$, $LRM_2$, $LRM_3$, $LRM_4$ carrying respective bits $S_1$, $S_2$, $S_3$, $S_4$ of a succession of four-bit binary words. The delay lines may be constituted by magnetostrictive wires on which a pulse $S_1 - S_4$, of a width less than 0.1 $\mu s$, travels for 799 $\mu s$ until reaching a transfer conductor 21, 22, 23, 24 by which it is nondestructively read out into a respective storage element $SR_1$, $SR_2$, $SR_3$, $SR_4$ of a one-stage shift register SR. From these transfer leads the bits can be retrieved on respective output conductors $U_1'$, $U_2'$, $U_3'$, $U_4'$ as the code word from a phase $\phi_{m+1}$ while output leads $U_1$, $U_2$, $U_3$, $U_4$ from shift register SR carry the code word from the preceding phase $\phi_m$ these two sets of conductors, accordingly, constitute a pair of output paths with relatively staggered transit times, owing to the presence of delay means $SR_1$–SR path $V_1$–$V_4$. Branches $U_1''$, $U_2''$, $U_3''$, $U_4''$ of leads $U_1 - U_4$ form a feedback loop returning the bits to the matrix LM for recirculation every 800 $\mu s$ in the absence of a modifying signal applied to one or more of the nine aforementioned inputs during the corresponding clock cycle.

These nine inputs and their respective functions have been designated $C_a$ (ADD 1), $C_s$ (SUBTRACT 1), $T_e$ (ENTER), $T_1$ (INSCRIBE 1), $T_0$ (INSCRIBE 0), and $E_1$, $E_2$, $E_3$, $E_4$ for the entry of respective bits of a new binary word upon concurrent energization of input $T_e$. In the presence of a signal on input $C_a$ the numerical value of the word is increased by 1; in the presence of a signal on input $C_s$ this value is correspondingly decreased. A signal on lead $T_1$ replaces the circulating word by the binary code 0001 (energization of transfer conductor 21) whereas a signal on lead $T_0$ cancels the existing word to energize none of the transfer conductors (code 0000). These input signals are effective only upon the concurrent energization of a further input of matrix LM by a clock pulse CP from timer T (FIG. 1) and applies to the particular phase appearing at the input ends of the delay lines during the existence of that clock pulse. The cadence of these clock pulses is $10^6$ c.p.s., corresponding to one memory phase per microsecond.

Thus, the two sets of output leads $U_1 - U_4$ and $U_1' - U_4'$ allow for the concurrent retrieval of the contents of two consecutive phases circulating in the memory, such as the phases $\phi_{20}(S)$, $\phi_{21}(S)$ of memory section $\mu s$.

In actual practice, as more fully described in the above-identified commonly owned applications and patents, output leads $U_1 - U_4$ and $U_1' - U_4'$ may be paired with respective companion leads carrying the corresponding signal inversions $\overline{U}_1 - \overline{U}_4$, $\overline{U}_1' - \overline{U}_1'$. Also, the actual mechanism for the entry of a bit into a delay line may be more complex than a simple coincidence of a clock pulse CP with an input signal, as described in U.S. Pat. No. 3,603,774, to insure precise timing; for an understanding of our invention, however, these refinements are not essential.

The digital counter 100 of FIG. 1 may be a circulating memory similar to that shown in FIG. 7, with 100 pairs of consecutive phases carrying the addresses of all the line links $LL_{00}$ – $LL_{99}$. These addresses are made available by the decoder 1010 in the form of voltages appearing, as shown in FIG. 3, on two sets of output leads collectively designated $D_{jk}$ in FIG. 1. Since the scanner SC of FIG. 1 opens the line switches $P_{jk}$ at a rate of 10,000 times per second, the address of every line link should appear in the output of counter 100 in the course of a single scanning period of 100 $\mu s$. As these addresses are needed, however, only once per repetition cycle of memory 300, i.e. every 800 $\mu s$, the output of the counter needs to be tapped only during one-eighth of a cycle of memory 300, advantageously during the interval of 100 $\mu s$ allocated to the reproduction of the phases $\phi_0 - \phi_{99}$ of section $M_C$. Thus, the counter may be a 799-phase memory similar to memory 300, in which case 699 of its phases may be unused or utilized for other purposes not here relevant. With the aid of a shift register like the one shown at SR in FIG. 7, the contents of two consecutive counter phases thereof can then be made simultaneously available to provide the two decimal digits of any line number. Alternatively, the counter could also be a 100-phase circulating memory with a recirculation period of 100 $\mu s$, divided into two parallel sections for the tens and units digits.

Figure 3:
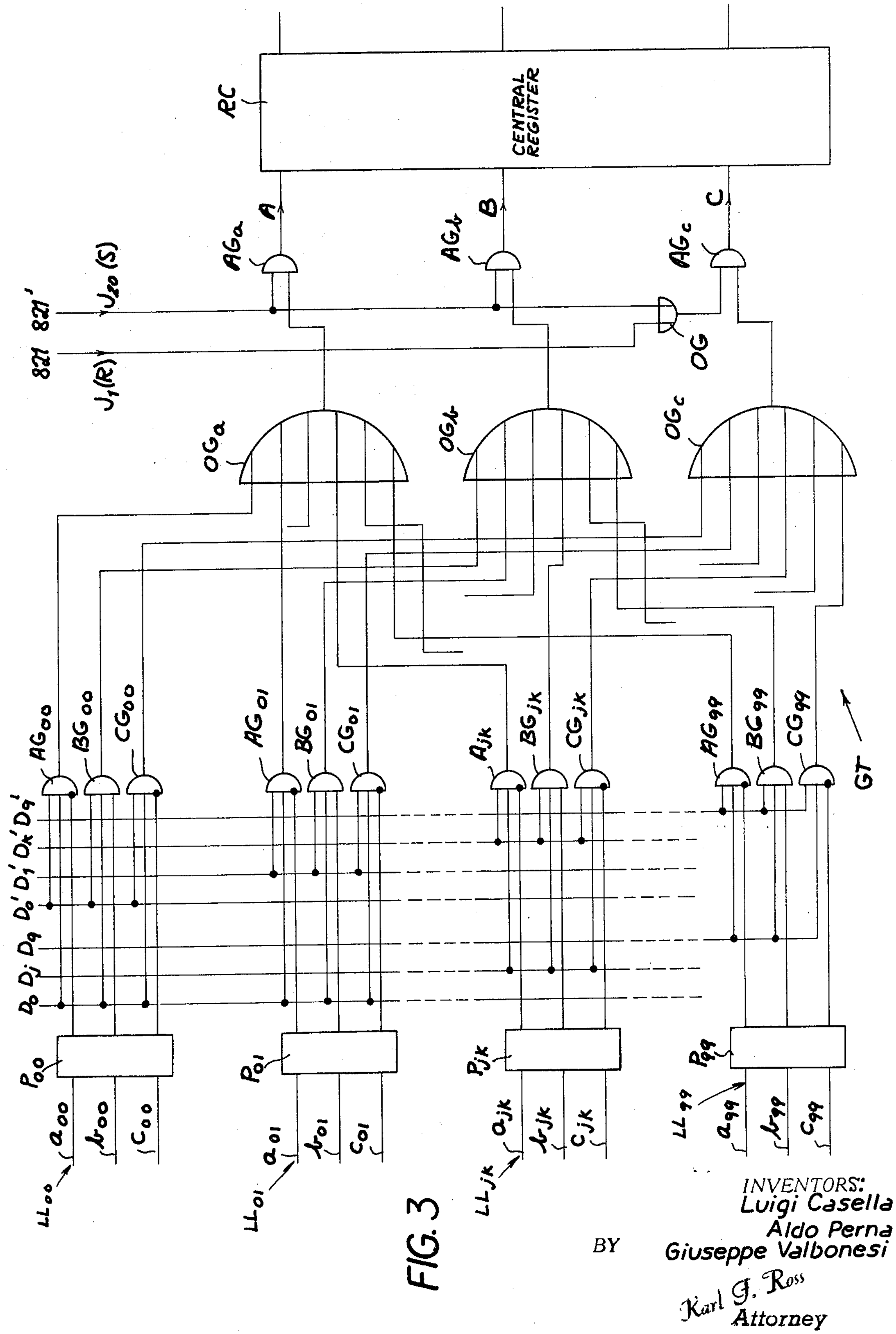
FIGS. 3 and 4 are circuit diagrams of additional components of the system of FIG. 1.

In any event, the output leads $D_{jk}$ of the decoder 1010 of FIG. 1 are grouped in two sets of ten output leads each which in FIG. 3 have been designated $D_0, \ldots . . D_j, \ldots . . D_9$ and $D_0'$, $D_1', \ldots . . D_k', \ldots . . D_9'$. These leads are multiplied to a set of AND gates inserted in the "*a*," "*b*" and "*c*" wires of respective line links $LL_{00}$, $LL_{01}$, . . . . . $LL_{jk}$, . . . . . $LL_{99}$, beyond their scanner-controlled line switches $P_{00}$, $P_{01}$, . . . . . $P_{jk}$, . . . . . $P_{99}$. These AND gates have been designated $AG_{00}$, $AG_{01}$, $AG_{jk}$, $AG_{99}$ for wires $a_{00}$, $a_{01}$, $a_{jk}$, $a_{99}$ ; $BG_{00}$, $BG_{01}$, $BG_{jk}$, $BG_{99}$ for wires $b_{00}$, $b_{01}$, $b_{jk}$, $b_{jk}$, $b_{99}$; and $CG_{00}$, $CG_{01}$, $CG_{jk}$, $CG_{99}$ for wires $c_{00}$, $c_{01}$, $c_{jk}$, $c_{99}$. Lead $D_0$ terminates at all AND gates having "0" in the tens digit of their subscripts, such as gates $AG_{00}$, $BG_{00}$, $CG_{00}$ and $AG_{01}$, $BG_{10}$, $CG_{01}$; lead $D_0'$ terminates at all AND gates having "0" in the units digit of their subscripts, such as gates $AG_{00}$, $BG_{00}$, $CG_{00}$. Analogous connections have been shown for the other illustrated output leads of decoder 1010.

The first AND gate ($AG_{00} - AG_{99}$) of each line works into a common OR gate $OG_a$; similar OR gates $OG_b$ and $OG_c$ are provided for the second and third AND gates. Each of these OR gates feeds an input of a respective AND gate $AG_a$, $AG_b$, $AG_c$ having a second input connected to the output lead 821' of comparator 820' (FIG. 1). The second input of gate $AG_c$ is also connected, through a further OR gate OG, to the output lead 821 of comparator 820. Upon the simultaneous energization of one conductor, such as $D_j$, in the first set of decoder output leads and another conductor, such as $D_k'$, in the second set of decoder output leads, the corresponding AND gates $AG_{jk}$, $BG_{jk}$, $CG_{jk}$ are opened so that OR gates $OG_a$, $OG_b$, $OG_c$ conduct and unblock the gates $AG_a$, $AG_b$ and $AG_c$ in the presence of a pulse $J_{20}(S)$ on lead 821'; gate $AG_c$ also conducts in the presence of a pulse $J_1$ (R) on lead 821. This gives rise to respective signals A, B and C fed to central register RC.

It will be recalled that signals A and C are to be generated upon a grounding, rather than an energization, of the corresponding "*a*" or "*c*" wire. This has been indicated diagrammatically in FIG. 3 by an inversion point at the junctions of these wires with their respective AND gates $AG_{00} - AG_{99}$ and $CG_{00} - CG_{99}$.

The signal $J_{20}(S)$ comes into existence whenever the contents of phases $\phi_{20}$ and $\phi_{21}$ of memory section $M_S$, delivered to buffer register 800' on output leads $U_1 - U_4$ and $U_1' - U_4'$, respectively, match the instantaneous output of digital counter 100 appearing on lead 120. Similarly, signal $J_1(R)$ is generated when the contents of phases $\phi_1$ and $\phi_2$ of any unit RET of memory section $M_R$, as stored in buffer register 800, match the instantaneous output of counter 100. The two lines designated $\phi_1(R)$ and $\phi_{20}(S)$ in FIG. 1 symbolize respective signal paths extending from conductors $U_1 - U_4$ and $U_1' - U_4'$ through respective gates opened by the timer T upon the occurrence of the corresponding phases.

Figure 4:
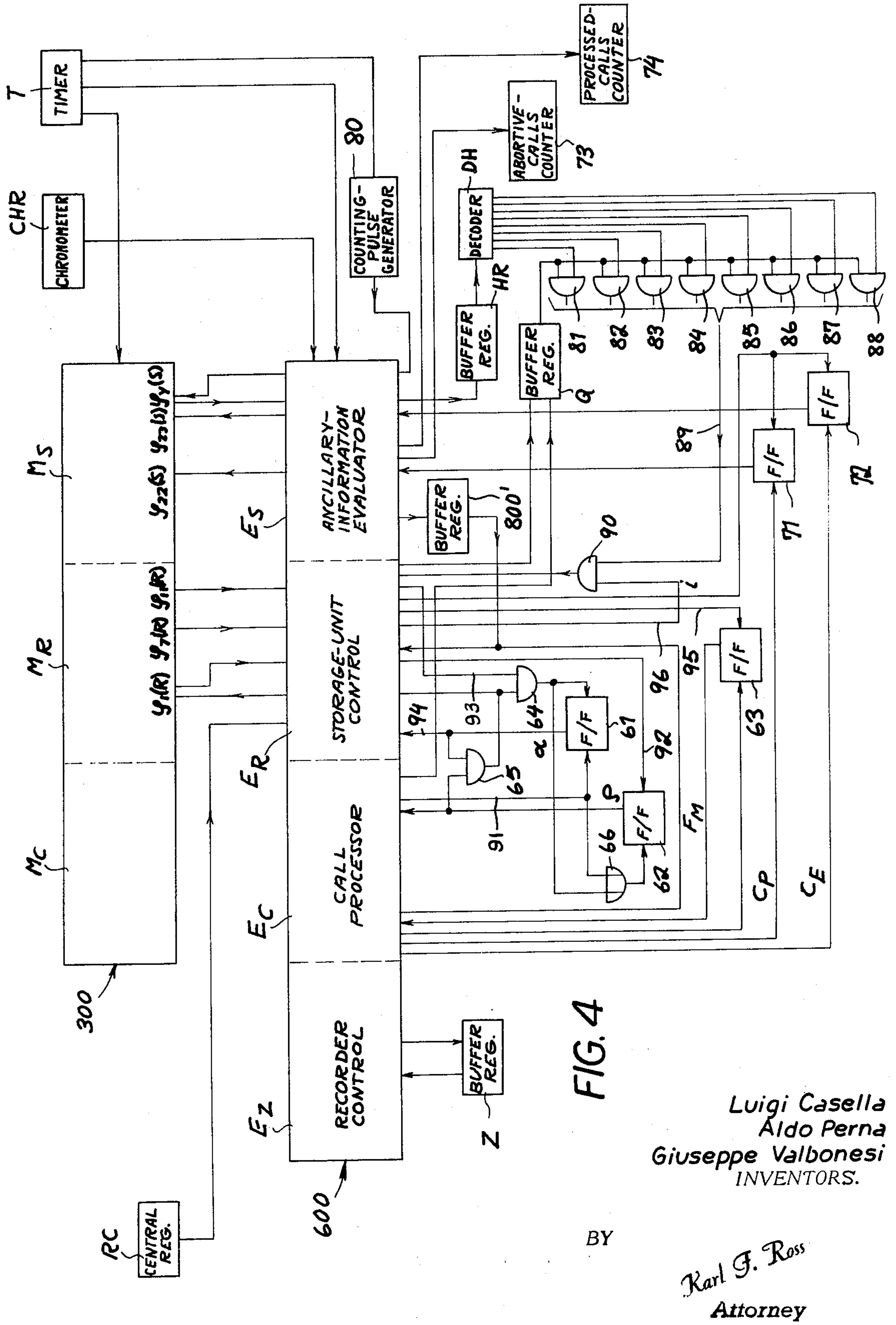

In FIG. 4 we have shown details of the data processor 600 which is also subdivided into several sections, namely a recorder-control section $E_Z$, an ancillary-information evaluator $E_S$, a call processor $E_C$ and a storage-unit control $E_R$. Section $E_R$ has access to the central register RC which includes individual storage units for preserving the signals A, B and C of any line link $LL_{00} - LL_{99}$ from one sampling period to the next. In this connection it is worth noting that the sampling of a previously inactive line, under the control of signal pulse $J_{20}(S)$, occurs only once in every 100 repetition cycles but that a busy line is sampled at a considerably higher rate, up to once per cycle (as more fully described hereinafter), under the control of signal pulse $J_1(R)$.

Control section $E_Z$ co-operates with buffer register Z for seizing a free perforator PF at the beginning of a call, holding this perforator engaged for the requisite time and then releasing it when the call is terminated or answered.

To make the relationship between memory sections $M_C$, $M_R$, $M_S$ and data-processor sections $E_C$, $E_R$, $E_S$ more readily apparent, FIG. 4 shows these respective sections in confronting relationship even though only a few of the connections therebetween have been illustrated. It will be understood that these connections actually represent signal paths periodically gated under the control of timer T, as explained above with reference to lines $\phi_1(R)$ and $\phi_{20}(S)$ of FIG. 1.

Section $E_S$ receives additional information from a chronometer CHR as well as from the control panel QC illustrated in FIG. 1. An output of this section terminates at the buffer register 800' designed to store the address of a line under test, taken from counting phases $\phi_{20}(S)$ and $\phi_{21}(S)$ of memory section $M_S$, for the requisite length of time; in the more schematic representation of FIG. 1 this buffer register has been shown directly connected to an output of memory 300. Companion register 800 of FIG. 1, not shown in FIG. 4, is of course similarly supplied through the intermediary of logic network 600.

Another buffer register Q serves for the transfer of data from evaluator $E_S$ and from the subunit $M_{el}$ of any seized storage unit RET (via control network $E_R$) to the corresponding subunit $M\phi$, along with supplemental data from call processor $E_C$. Buffer register Q may include as many storage elements as are needed for the simultaneous preservation of all the pertinent information, more fully detailed below, in which event this register could be cleared once very 800 $\mu s$ to allow for a resampling of a busy line during every repetition cycle. In practice, however, such frequent resampling is usually not required so that, in accordance with a preferred arrangement, the buffer register Q is designed to accommodate only one code word at a time and is periodically gated under the control of a counting-pulse generator 80 tripped by the timer T once per repetition cycle. As here shown, counter 80 works into evaluator $E_S$ to step the numerical value of a code word in a phase $\phi_\mu(S)$ of memory section $M_S$ (via input $C_a$ of FIG. 7) once per cycle; the starting value "1" is entered in this otherwise blanked phase at appropriate times (via input $T_1$) by the network $E_R$ in certain states thereof described below with reference to FIG. 5A. This numerical value is temporarily stored in a buffer register HR and converted into its decimal equivalent by a decoder DH having eight outputs terminating at respective AND gates 81 – 88 which also receive the output of buffer register Q. It will be understood that each of these AND gates is representative of a set of, say, four such gates serving as many output leads of register Q. The output leads emanating from AND gates 81 – 88 have been collectively designated 89.

Also shown in FIG. 4 are several flip-flops 61, 62 and 63 designed to generate, respectively, a request signal $\alpha$ for a free storage unit RET, an availability signal $\rho$ concerning such unit, and an "end of first message" signal $F_M$ indicating a response by the called party which suspends the monitoring operation upon the termination of the initial stage of a call. This Figure further shows two flip-flops 71 and 72 which control the count of abortive calls (in the event of unavailability of a storage unit RET) and processed calls (upon the availability of such a unit) by two counters 73 and 74, respectively.

In the ensuing detailed description of a typical operating cycle of the system shown in FIG. 4, given with reference to FIGS. 5A, 5B and 6A, 6B, reference may be made to the following Table which shows, pursuant to ITT Communications Code No. 2, ten numerical and five extranumerical symbols, together with their corresponding code words adapted to be registered in any phase of memory 300.

TABLE

| Symbol | Digital value | Code word | Pulse-interval classification | | Additional significance |
|---|---|---|---|---|---|
| 1 | 1 | 0001 | 1 | Events | End of selection. |
| 2 | 2 | 0010 | 2 | Events | Line free. |
| 3 | 3 | 0011 | 3 | Events | Busy signal. |
| 4 | 4 | 0100 | 4 | Events | Start of conversation. |
| 5 | 5 | 0101 | 5 | Events | Disengagement. |
| 6 | 6 | 0110 | 6 | | |
| 7 | 7 | 0111 | 7 | | |
| 8 | 8 | 1000 | 8 | | |
| 9 | 9 | 1001 | 9 | | |
| 0 | 0 | 1010 | 10 | | |
| = | | 1011 | 11 | | |
| □ | | 1100 | 12 | | |
| △ | | 1101 | 13 | | |
| ; | | 1110 | | | End of message. |
| ? | | 1111 | | | Event indicator |

The classes of inter-digit pulse intervals listed in the foregoing Table, which depend on the dialing speed of the caller, are derived from a given time base $\tau$, which may be fed into the memory from control panel QC, according to the formula $$(N-1)\,\tau \leq d \leq N\tau$$

where $d$ is the duration of the interval and N is the resulting class. For the highest class ($N = 13$) only the lower limit is applicable, i.e. $d \geqslant 6$ sec if $\tau = 0.5$ sec. The same classification may be used for other pauses occurring both before and after dialing.

With the foregoing symbols and code words, the recordable data and events characterizing an attempted or completed call between two parties can be entered both temporarily in the monitoring memory 300 and permanently in the tape punched by the perforator PF. The event indicator (?), permanently registered in a phase of memory section $M_S$, precedes any code word which is to be interpreted as an event in accordance with the first five items in the fifth column of the preceding Table. Since the pause-classifying signals are used only when there are no dial pulses to be counted, no confusion can occur between the meanings appearing in the second and fourth columns.

The data to be stored in the perforator can be divided into two distinct messages. The first message, dealing with the initial stage of a call, includes the line-link identification or address, the time of seizure of the line link, the numerical values of the dialed digits, the classification of the intervening pauses, the end-of-selection time, and the time of beginning conversation upon the response of the called party. If the caller hangs up prematurely, this first message is correspondingly foreshortened. The second message, which comes into existence only if there is a response, includes again the line-link number along with just one chronometric information, i.e. the time of disengagement.

In the following illustrative example it has been assumed, for the sake of simplification, that the called party is identifiable by a four-digit decimal number. The time of any event is given in ten-thousands, thousands, hundreds, tens and units of seconds.

EXAMPLE:

Line-link number: 76
Time of seizure: 40341 seconds
Called number: 4731
Start of conversation: 40442 seconds
End of conversation: 40577 seconds
Length of conversation: 135 seconds First Message

7 )
) Address
6 )
4 )
)
0 )
)
3 ) Time
)

4 )
)
1 )
9 Pause (Class 9)
1 First digit
3 Pause (Class 3)
7 Second digit
8 Pause (Class 8)
3 Third digit
0 Pause (Class 10)
1 Fourth digit
2 Pause (Class 2)
? )
) End of selection
1 )
4 )
)
0 )
)
4 ) Time
)
0 )
)
5 )
? )
) Start of conversation
4 )
4 )
)
0 )
)
4 ) Time
)
4 )
)
2 )
, End of message Second Message 7 )
) Address
6 )
4 )
)
0 )
)
5 ) Time
)
7 )
)
7 )
, End of message The nine phases $\phi_0 - \phi_8$ of subunit $M_{el}$ of any unit RET are assigned the following functions:

Phase $\phi_0$ is a test phase for the proper operation of the delay lines $LRM_1 - LRM_4$. It is normally vacant and the presence of any bit therein would indicate a malfunction.

Phases $\phi_1$ and $\phi_2$ serve for the storage of the tens and units digits of the line-link address or identification number. The vacancy (code 0000) of phase $\phi_1$ indicates the availability of the corresponding unit RET.

Phase $\phi_3$ registers the state of energization of line wire "*a*." This information, when evaluated by the call processor $E_C$, reveals the presence of either a dial pulse or a pause.

Phase $\phi_4$ is a counting phase supplying the timing information required by section $E_C$ for the recognition of dial pulses and pauses.

Phase $\phi_5$ registers the state of energization of line wires "*b*" and "*c*." Together with the information stored in phase $\phi_3$, this enables ascertainment of line release and of the response of a called subscriber or trunk.

Phase $\phi_6$ counts the number of digits dialed, being stepped in response to end-of-digit signals generated in section $E_C$.

Phase $\phi_7$ times the read-out of data from subunit $M_{el}$.

Phase $\phi_8$ registers the values of dialed digits and the classification of the pauses.

The address information inscribed in phases $\phi_1$ and $\phi_2$ may also be registered in phases $\phi_9$ and $\phi_{10}$ of subunit $M\phi$, if necessary.

The transfer of the contents of subsection $M_{el}$ to subsection $M\phi$ involves eight types of entries in the specific embodiment here described. These entries, designated $M_1 - M_8$, are:

$M_1$: Line address (from phases $\phi_1$ and $\phi_2$); selection digits and classification of pauses (from phase $\phi_8$).

$M_2$: Event indicator (?) from a phase of memory section $M_S$.

$M_3$: Type of event.

$M_4$: Time in $10^4$ seconds.

$M_5$: Time in $10^3$ seconds.

$M_6$: Time in $10^2$ seconds.

$M_7$: Time in tens of seconds.

$M_8$: Time in seconds.

The provision of counting-pulse generator 80 of FIG. 4 enables these eight items to be sequentially stored on buffer register Q and read out via gates 81 – 88, in successive repetition cycles, over the set of leads 89 to an AND gate 90 which also receives, on a lead 96 from network $E_R$, an enabling signal i in step with phase $\phi_7$(R) to perform the transfer. Naturally, AND gate 90 is representative of a multiplicity of such gates inserted in the various signal paths emanating from buffer register Q.

Figure 5A:
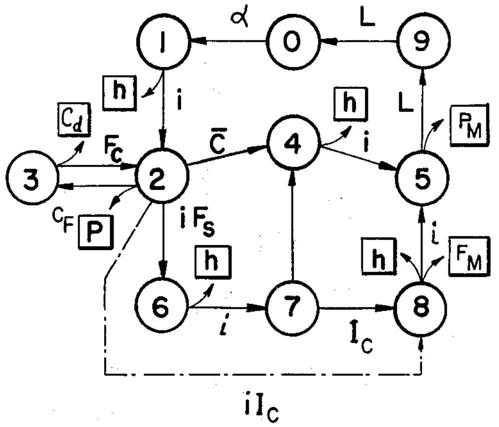
FIG. 5A is a flow diagram depicting the mode of operation of a network shown in FIG. 4.
Figure 6A:
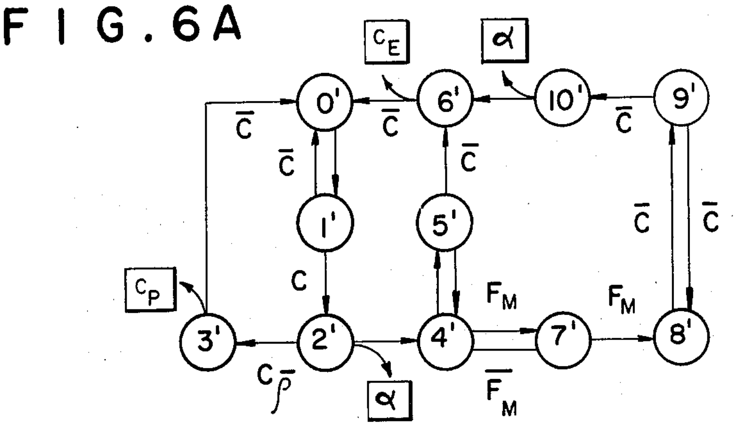
FIG. 6A is a flow diagram depicting the mode of operation of another network shown in FIG. 4.

Reference will now be made to FIGS. 5A and 6A for a description of the mode of operation of storage-unit control $E_R$ and of the correlated activities of call processor $E_C$.

In FIG. 5A the state 0 denotes the quiescent condition of network $E_R$, i.e. the case of an idle line link $LL_{jk}$ as indicated by the contents of the corresponding phase $\phi_{jk}$ of memory section $M_C$. When the line link $LL_{jk}$ is seized and its "*c*" wire is grounded, call processor $E_C$ advances from its own quiescent state 0′ (FIG. 6A) to state 1′. This is a transitory state which lasts for only one cycle and from which the system returns to state 0′ if, in the next sampling period 80 ms later, the signal C has disappeared (i.e. has changed to its inversion $\overline{C}$), thus indicating a spurious condition. If the line seizure is verified, i.e. if signal C persists, network $E_C$ moves to state 2′ which serves to determine the availability of a free storage unit RET. Such availability is indicated by the setting of flip-flop 62, FIG. 4, in response to a signal on a line 92 which detects the vacant condition of phase $\phi_l$(R) of any unit RET. Flip-flop 62 then emits a signal $\rho$ which advances the network $E_C$ from state 2′ to state 4′ with energization, via a lead 91, of flip-flop 61 to emit the request signal $\alpha$. This request signal, in turn, causes the network $E_R$ to step from state 0 to state 1 as shown in FIG. 5A.

The setting of flip-flop 61 coincides with the resetting of flip-flop 62 by way of an OR gate 66, yet the latter flip-flop is promptly reset upon the occurrence of the next phase $\phi_1$(R) of the same of some other available storage unit RET. The concurrent setting of flip-flops 61 and 62 opens an AND gate 65 working into another AND gate 64 which thereafter, in phase $\phi_{11}$(R), receives a signal on a lead 93 to reset both flip-flops. Meanwhile, in response to the concurrent presence of signals $\alpha$ and $\rho$, network $E_R$ has been actuated via a lead 94 to inscribe the address of the line link $LL_{jk}$ (as stored in buffer register 800′) in time slots $\phi_1$(R) and $\phi_2$(R) of the engaged unit RET which thereby becomes unavailable for further calls.

If the signal $\rho$ had been absent after the processor $E_C$ had reached the state 2′, this network would have shifted to state 3′ and then, upon release of the line by the caller (signal $\overline{C}$) who did not get a dial tone, would have returned to state 0′ with emission of a signal $C_P$ indicating an abortive call. Signal $C_P$ would have set the flip-flop 71 for a stepping of counting phase $\phi_{22}$(S), with subsequent activation of counter 73. Since this counting phase can hold only ten different decimal values, it restarts from 0 after reaching the numerical value 9 and concurrently emits a carry signal to step the tens reel of counter 73. Phase $\phi_{23}$(S) and counter 74 co-operate in a similar manner.

With the inscription of the first recordable item $M_1$, i.e. the address, in subunit $M_{el}$, buffer register Q (FIG. 4) is loaded so as to have an output which reaches the network section $E_R$ through AND gate 90 in the presence of enabling signal *i* on lead 96. Signal *i* may be generated by a flip-flop, not shown, which is set by network $E_C$ concurrently with the generation of the INSCRIBE 1 signal serving to start the eight-cycle count of phase $\phi_v(S)$ controlled by pulse generator 80. When this phase reaches the count 8, the flip-flop is reset so that signal $i$ vanishes with simultaneous clearing of the counting phase. If the line address is already stored in phases $\phi_9(R)$ and $\phi_{10}(R)$, no actual transfer to subunit $M\phi$ is necessary. Signal i advances the network $E_R$ to its state 2 and causes emission of a chronometric signal $h$ which calls for the inscription of the time in buffer register Q. Because of the assumed limited storage capacity of this register, the entry of the corresponding items $M_4 - M_8$ in unit RET takes place in consecutive memory cycles, rather than in a single step as indicated diagrammatically in FIG. 5A. The transfer of some or all of the eight entries $M_1 - M_8$ available at a given instant can thus be effected in eight memory cycles accounting for 6.4 ms.

If the caller hangs up before dialing the called party or without awaiting a response, the network $E_C$ proceeds from state 4′ to state 6′ by way of a transition state 5′ from which it returns to state 4′ if the release signal $\overline{C}$ is not verified but is due to a transient. Upon continuation of signal $\overline{C}$, the processor returns to state 0′ with emission of a counting signal $C_E$ for a processed call. This signal sets the flip-flop 72 with consequent stepping of counting phase $\phi_{23}(S)$ and counter 74.

If the call proceeds, the arrival of dial pulses is duly registered in the corresponding phase $\phi_{jk}(C)$ of memory section $M_C$ and also simultaneously in storage unit RET, with subsequent transfer of the data from subunit $M_{el}$ to subunit $M\phi$. At the start of each pulse train, there is generated in network $E_C$ a digit signal $C_F$ which shifts the network $E_R$ to state 3 with concurrent emission of a pause signal P to indicate the end of the preceding interval. Cessation of the pulse train gives rise to an end-of-digit signal $F_C$ which returns the network to state 2 and produces a signal $C_d$ commanding the inscription of the digit in unit RET. An end-of-selection signal $F_S$ lets the network $E_R$ advance to state 6 whence it moves on to state 7 in response to the next enabling signal $i$, with emission of another chronometric signal $h$ to command the inscription of the time. If, in state 2 or 7, the system should detect the release of the line (signal $\overline{C}$), it would switch to state 4 and thence continue to state 5 upon the next enabling signal $i$ with generation of a further chronometric signal $h$. In state 7 the network $E_R$ responds to a signal $I_C$ indicating that the called party has answered; as suggested by a dotted line in FIG. 5A, the answer signal $I_C$ could also bring the network directly from state 2 to state 8 if the exchange lacks means for generating an end-of-selection signal $F_S$.

Signal $I_C$ calls forth another event marker (?) from memory section $M_S$, preparatorily to entry of the start-of-conversation code in buffer register Q. The accompanying enabling signal $i$ again produces a chronometric signal $h$ as well as an end-of-message signal $F_M$ which is generated by the setting of flip-flop 63 via a lead 95. Network $E_R$ now advances to state 5 where it triggers the recorder control $E_Z$ to search for a free perforator PF (FIG. 1); since there are at least as many perforators as storage units RET, such a recorder is always available at this point. Its seizure gives rise to a signal L, transmitted from section $E_Z$ to section $E_R$, which steps that section to its state 9 with emission of a command signal $P_M$ to initiate the punching of the message. The output register 200 of FIG. 1, which intervenes in the control of the perforator, stores the information over a sufficient length of time to compensate for the differences in operating speed between the logic of FIG. 4 and the recorder PF. In the continuing presence of signal L, network $E_R$ finally returns to state 0.

Meanwhile, in response to the end-of-message signal $F_M$, network $E_C$ has advanced from state 4′ to state 8′ by way of transition state 7′ from which it would have returned to state 4′ if the end of the message had not been verified (signal $\overline{F}_M$) upon the release of the line.

The various states of network $E_C$ illustrated in FIG. 6A are inscribed in the corresponding phase $\phi_{jk}(C)$ of memory section $M_C$ where the state 8′ remains registered for the duration of the conversation even though the unit RET in memory section $M_R$ is released and all its phases are cleared upon the return of network $E_R$ to state 0; any flip-flop of FIG. 4 heretofore set is also reset at this time. When the conversation is terminated, the release signal $\overline{C}$ on the corresponding "$c$" wire advances the network $E_C$ to state 10′ by way of transition state 9′ which, like the other transition states described above, serves to filter out any spurious signal. In state 10′ the network $E_C$ performs as before in state 2′, with emission of a request signal $\alpha$ and advancement to the next state (here 6′) in the presence of an availability signal $\rho$ indicating a free storage unit RET. This unit is then seized, as before, while the network $E_R$ switches first to state 1 and then to state 2 with emission of a chronometric signal $h$ and transfer of the time information from clock circuit CHR to a unit RET of memory 300. In view of the presence of release signal $\overline{C}$, network $E_R$ is then switched to state 4 while network $E_C$ returns to state 0′ with emission of another counting signal $C_E$ for the setting of flip-flop 72 and the stepping of counter 74. This counter, therefore, separately registers each seizure of a storage unit RET in both the initial and the terminal stage of a call.

With the return of network $E_C$ to normal, network $E_R$ is also cleared, as is the unit RET bearing the information on the state of that network. Unit RET therefore becomes once again available for another call.

The following logical equations express the mode of operation of network $E_C$ as described above with reference to FIG. 5A, with $T_O - T_9$ designating certain terminals (illustrated in FIG. 5B) which are energized in the respective states 0 – 9 of that network.

EQUATIONS (A)

$$T_0 = D_9 L$$
$$T_1 = D_0 \alpha$$
$$T_2 = (D_1 + D_3 F_C)\, i$$
$$T_3 = D_2 C_F$$
$$T_4 = (D_2 + D_7)\, C$$
$$T_5 = (D_4 + D_8)\, i$$
$$T_6 = D_2 F_S$$
$$T_7 = D_6 i$$
$$T_8 = (D_7 + D_2)\, I_C$$
$$T_9 = D_5 L$$

The signals emitted by network $E_R$ satisfy the following logical equations:

EQUATIONS (B)

$$h = D_1 + D_4 + D_6 + D_8$$
$$P = D_2 C_F$$
$$C_d = D_3 F_C$$
$$F_M = D_8 i$$
$$P_M = D_5 L$$

Figure 5B:
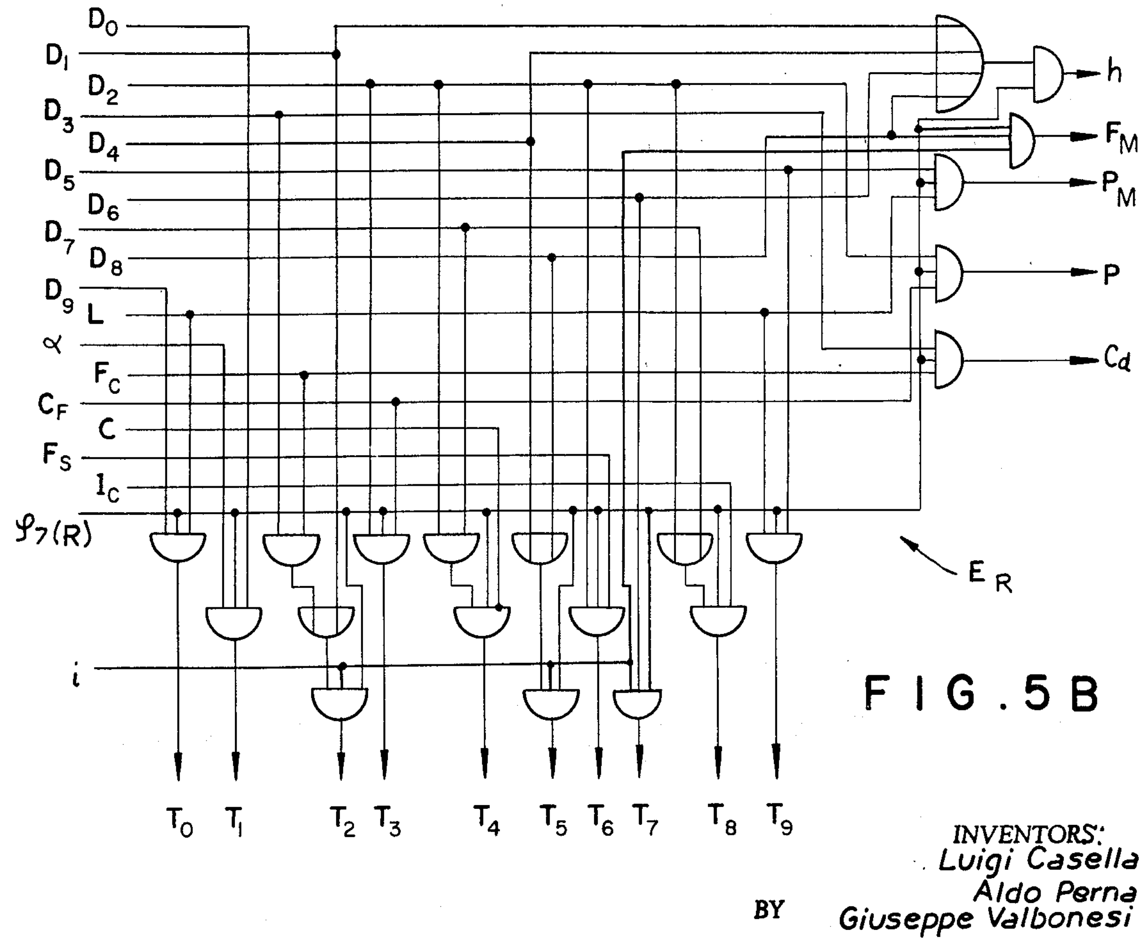
FIG. 5B shows the logic of the same network.

The logic matrix of FIG. 5B includes a number of AND and OR gates connected, in a manner consistent with the foregoing equations, between input terminals $D_O - D_9$ (representing signals of output terminals $T_0 - T_9$ (after coding, recirculation by memory 300 and decoding), L, $\alpha$, $F_C$, $C_F$, $F_S$, $I_C$, $i$ and output terminals $T_0 - T_9$, $h$, $F_M$, $P_M$, P and $C_d$. Also shown in FIG. 5B is an input lead carrying the timing signal $\phi_7(R)$ coinciding with the phase of unit RET during which the transition from one network state to another, and the registration thereof in that storage unit, takes place. This timing signal introduces a common factor in the foregoing equations which has been omitted there for the sake of simplicity.

The next set of logical equations relates to the operation of network $E_C$ as described above with reference to FIG. 6A. Again, $T_O' - T_{10}'$ designate output terminals (shown in FIG. 6B) which are energized in the corresponding states 0′ – 10′ of FIG. 6A.

EQUATIONS (C)

$$T_0' = (D_1 + D_3 + D_6)\, \overline{C}$$
$$T_1' = D_O C$$
$$T_2' = D_1 C$$
$$T_3' = D_2 C \overline{\rho}$$

$T_4' = (D_2\rho + D_5)\,C + D_7\,\overline{F}_M$
$T_5' = D_4\,\overline{C}$
$T_6' = D_5\,\overline{C} + D_{10}\rho$
$T_7' = D_4\,F_M$
$T_8' = D_7\,F_M + D_9\,C$
$T_9' = D_8\,\overline{C}$
$T_{10}' = D_9\,\overline{C}$ The signals emitted by network $E_C$ satisfy the following logical equations:

EQUATIONS (D)

Figure 6B:
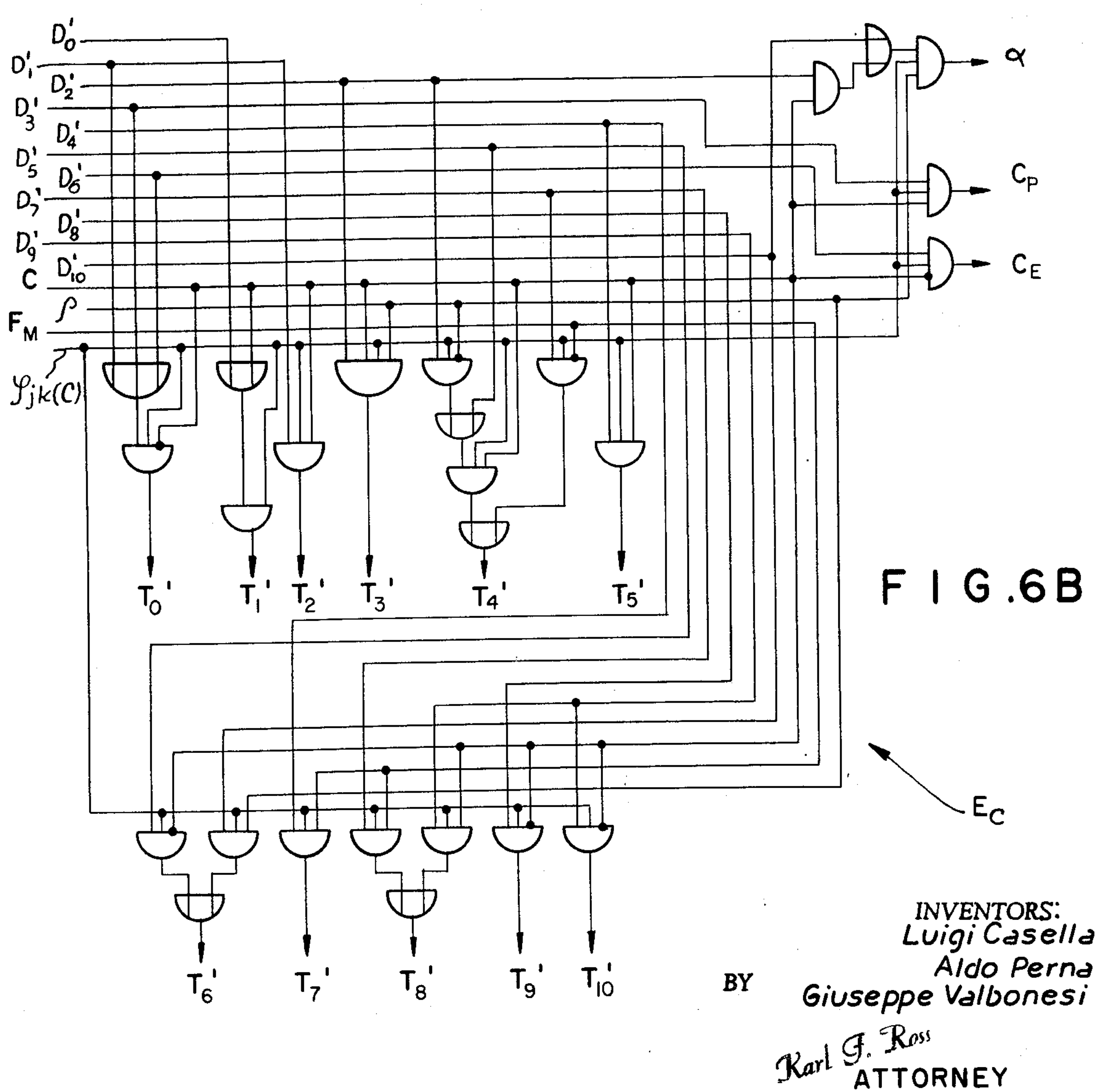
FIG. 6B shows the logic of the latter network.

$\alpha = (C\,D_2 + D_{10})\,\rho$
$C_P = D_3\,\overline{C}$
$C_E = D_6\,\overline{C}$ FIG. 6B shows a logic matrix, generally similar to that of FIG. 5B, with an array of AND and OR gates designed to perform the above-listed functions.

The input terminals for the recirculated signals have been designated $D_0' - D_{10}'$ by analogy with FIG. 5B; other input terminals carry the signals C, $\delta$ and $F_M$. Output terminals $T_0' - T_{10}'$ are supplemented by further terminals for the emitted signals $\alpha$, $C_P$ and $C_E$.

An additional input lead in FIG. 6B carries the timing signal $\phi_{jk}(C)$ coinciding with the corresponding phase of memory section $M_C$ in which the events detected by the network $E_C$ are registered for monitoring purposes.

Reference may be made to a copending application filed by us on even date herewith, Ser. No. 29,781, now U.S. Pat. No. 3,622,997, which discloses improvements in logical circuitry designed to discriminate between genuine signals and transient line voltages or currents, by the verification principle described above with reference to the transitory states of FIG. 6A, and to establish dependable criteria for distinguishing between signals or pauses of different duration by counting a predetermined number of memory cycles during which such a signal or pause persists. Such an improvement, while not essential for purpose of our present invention, could be utilized for example in the classification of pulse intervals as given in the foregoing Table of symbols and code words.

Naturally, our disclosed system may be modified in various ways, e.g. for monitoring only some of the occurrences heretofore discussed or limiting its operation to specific communication channels or terminals, selected lines (e.g. trunks) characterized by certain digital prefixes, or periods of heavy traffic not readily handled by conventional equipment.

The control panel QC may be provided with the usual signal lamps or other alarm indicators to alert an operator to an existing malfunction, such as the improper entry of a bit in memory phase $\phi_0(R)$.

The chronometer CHR may be conventionally quartz-stabilized and may have its output registered in respective phases of memory section $M_S$, instead of working directly into the data processor 600 as illustrated diagrammatically in FIG. 4.

We claim:

1. A time-sharing telecommunication system comprising an exchange; a multiplicity of local lines terminating at said exchange; test means at said exchange for cyclically detecting the state of energization of said lines in the course of a scanning period; a circulating monitoring memory with a repetition cycle equal to said scanning period, said monitoring memory being serially divided into several sections including a multi-phase first section subdivided into a multiplicity of time slots individually assigned to respective local lines and a second section subdivided into a plurality of multiphase storage units for temporarily registering numerical information relating to any one of said lines; address means at said exchange synchronized with said monitoring memory for selectively operating said test means in different time slots of said first section, identifying respective lines, during successive repetition cycles; logical circuitry at said exchange connected to said monitoring memory and to said test means for seizing a free storage unit upon initiation of a call on a line thus identified and for inscribing code words relating to the progress of said call in successive phases of the seized storage unit and in an assigned time slot of said first section; data-processing means in said circuitry for discriminating among different events including (a) discontinuance of an uncompleted call by the initiating party, (b) response of a called party and (c) completion of a call after establishment of inter-party communication; recording means for data relating to such call; and control means for said recording means connected to said monitoring memory for reading out the numerical information registered in said seized storage unit during an initial stage of the call, said initial stage ending with the occurrence of either one of events (a) and (b); said circuitry being responsive to the ending of said initial stage for releasing the seized storage unit and to the occurrence of event (c), relating to a call whose progress is registered by a code word inscribed in the assigned time slot, for thereafter again seizing a free storage unit with reactivation of said control means to record further information registered therein during a terminal stage of the call.

2. A system as defined in claim 1 wherein each of said storage units includes a first subunit with phases for instantly receiving said code words from said circuitry and a second subunit with additional phases for subsequently storing said data preparatorily to their transmission to said recording means, said circuitry comprising transfer means for shifting said code words from said first to said second subunit.

3. A system as defined claim 2 wherein said sections include a third section with phases for ancillary information.

4. A system as defined in claim 3 wherein said transfer means has access to said third section for retrieving said ancillary information and storing same in certain of said additional phases substantially concurrently with related code words from said first subunit.

5. A system as defined in claim 4 wherein said exchange is provided with clock means for registering chronometric data in said third section as part of said ancillary information.

6. A system as defined in claim 5 wherein said chronometric data occupy several clock phases of said third section, said monitoring memory being provided with a counting phase advancing once every repetition cycle for sequentially reading out the contents of said clock phases to said transfer means.

7. A system as defined in claim 5 wherein the phases of said third section include a plurality of consecutive counting phases, said address means comprising a digital counter and comparison means having access to the output of said counter an to said consecutive counting phases for matching the contents thereof with the counter output during each repetition cycle, said counting unit advancing once every repetition cycle.

8. A system as defined in claim 7 wherein said monitoring memory is provided with several output paths having relatively staggered transit times for giving simultaneous access to said plurality of consecutive phases, said comparison means including a buffer register for storing the contents of the phases of said counting unit, read out via said several output paths, until recurrence of the counter output.

9. A system as defined in claim 1 wherein each of said storage units includes at least one address phase for receiving the identification of a line to be tested, said circuitry comprising first bistable means settable by said data-processing means for signaling the initiation of a call and second bistable means settable under the control of said address phase for signaling the availability of such storage unit in the absence of a line-identifying code word in said address phase, said circuitry further comprising resetting means for said first and second bistable means operative in a subsequent phase of said storage unit upon concurrent setting thereof.

10. In a time-sharing telecommunication system comprising gate means adapted to give access to any one of a multiplicity of local lines identified by call numbers of at least two digits, the combination therewith of a circulating memory with a plurality of consecutive phases, inscription means for consecutively entering the digits of the call number of any one of said lines in said phases, counting means for periodically reproducing the combinations of digits of the call numbers of all said lines in cyclic succession, said memory being provided with several output paths having relatively staggered transit times for making the contents of said consecutive phases simultaneously available at a predetermined point of a repetition cycle, comparison means connected on the one hand to said counting means and on the other hand to said output paths for matching the simultaneous contents of said consecutive phases with the call numbers reproduced by said counting means, and circuit means for operating said gate means under the control of said comparison means to give access to a line identified by a matching call number.

11. The combination defined in claim 10 wherein said memory comprises a plurality of parallel delay lines, a single-stage shift register with a like plurality of storage elements, and transfer means for nondestructively reading out the contents of said delay lines and entering same in respective storage elements of said shift register, said staggered output means including a first set of leads connected to said transfer means and a second set of leads connected to the outputs of said storage elements.

* * * * *